(12) United States Patent
Ajayan et al.

(10) Patent No.: US 9,312,540 B2
(45) Date of Patent: Apr. 12, 2016

(54) CONFORMAL COATING ON NANOSTRUCTURED ELECTRODE MATERIALS FOR THREE-DIMENSIONAL APPLICATIONS

(75) Inventors: Pulickel M. Ajayan, Houston, TX (US);
Fung Suong Ou, Fremont, CA (US);
Manikoth M. Shajiumon, Kannur (IN);
Sanketh R. Gowda, Los Gatos, CA (US); Arava L. M. Reddy, Houston, TX (US)

(73) Assignee: WILLIAM MARCH RICE UNIVERSITY, Houston, TX (US)

( * ) Notice: Subject to any disclaimer, the term of this patent is extended or adjusted under 35 U.S.C. 154(b) by 959 days.

(21) Appl. No.: 13/514,438

(22) PCT Filed: Dec. 10, 2010

(86) PCT No.: PCT/US2010/059946
§ 371 (c)(1),
(2), (4) Date: Sep. 18, 2012

(87) PCT Pub. No.: WO2011/072255
PCT Pub. Date: Jun. 16, 2011

(65) Prior Publication Data
US 2013/0017453 A1    Jan. 17, 2013

Related U.S. Application Data

(60) Provisional application No. 61/285,259, filed on Dec. 10, 2009.

(51) Int. Cl.
*H01M 4/485* (2010.01)
*H01M 4/04* (2006.01)
(Continued)

(52) U.S. Cl.
CPC ............ *H01M 4/485* (2013.01); *H01M 4/0438* (2013.01); *H01M 4/131* (2013.01);
(Continued)

(58) Field of Classification Search
None
See application file for complete search history.

(56) References Cited

U.S. PATENT DOCUMENTS

| 7,850,400 B2 | 12/2010 | Freitag et al. |
| 2006/0216603 A1 | 9/2006 | Choi et al. |
| 2008/0081256 A1 | 4/2008 | Madou et al. |

FOREIGN PATENT DOCUMENTS

| WO | 2009105773 A2 | 8/2009 |
| WO | 2009123666 A2 | 10/2009 |

OTHER PUBLICATIONS

Armand, M. et al., Building better batteries, Nature 2008, 451, 652-657.
(Continued)

*Primary Examiner* — Tracy Dove
(74) *Attorney, Agent, or Firm* — Winstead PC

(57) ABSTRACT

A fabrication process for conformal coating of a thin polymer electrolyte layer on nanostructured electrode materials for three-dimensional micro/nanobattery applications, compositions thereof, and devices incorporating such compositions. In embodiments, conformal coatings (such as uniform thickness of around 20-30 nanometer) of polymer Polymethylmethacralate (PMMA) electrolyte layers around individual Ni—Sn nanowires were used as anodes for Li ion battery. This configuration showed high discharge capacity and excellent capacity retention even at high rates over extended cycling, allowing for scalable increase in areal capacity with electrode thickness. Such conformal nanoscale anode-electrolyte architectures were shown to be efficient Li-ion battery system.

22 Claims, 13 Drawing Sheets

(51) Int. Cl.
| | |
|---|---|
| H01M 4/131 | (2010.01) |
| H01M 4/134 | (2010.01) |
| H01M 4/1391 | (2010.01) |
| H01M 4/1395 | (2010.01) |
| H01M 4/38 | (2006.01) |
| H01M 4/525 | (2010.01) |
| H01M 4/66 | (2006.01) |
| H01M 4/70 | (2006.01) |
| H01M 4/80 | (2006.01) |
| H01M 10/04 | (2006.01) |
| H01M 10/052 | (2010.01) |
| H01M 10/0565 | (2010.01) |
| H01M 10/058 | (2010.01) |

(52) U.S. Cl.
CPC ........... *H01M 4/134* (2013.01); *H01M 4/1391* (2013.01); *H01M 4/1395* (2013.01); *H01M 4/38* (2013.01); *H01M 4/525* (2013.01); *H01M 4/664* (2013.01); *H01M 4/70* (2013.01); *H01M 4/80* (2013.01); *H01M 10/0436* (2013.01); *H01M 10/052* (2013.01); *H01M 10/058* (2013.01); *H01M 10/0565* (2013.01); *H01M 10/0472* (2013.01); *Y02E 60/122* (2013.01)

(56) References Cited

OTHER PUBLICATIONS

Whittingham et al., Lithium Batteries and Cathode Materials, Chem. Rev. 2004, 104, 4271-4301.
Taberna, P. L. et al., High rate capabilities Fe3O4-based Cu nano-architectured electrodes for lithium-ion battery applications, Nat. Mater. 2006, 5, 567-573.
Chung, S. Y. et al., Electronically conductive phospho-olivines as lithium storage electrodes, Nat. Mater. 2002, 1, 123-128.
Li et al., A high-Rate, High-Capacity Nanostructured Tin Oxide Electrode, Electrochem. Solid-State Lett., 2000, 3, 316-318.
Arico, A. S. et al., Nanostructured materials for advanced energy conversion and storage devices, Nat. Mater. 2005, 4, 366-377.
Reddy, A. L. M. et al., Coaxial MnO2/Carbon Nanotube Array Electrodes for High-Performance Lithium Batteries, Nano Lett. 2009, 9, 1002-1006.
Endo, M. et al., Recent development of carbon materials for Li ion batteries, Carbon 1999, 38, 183-197.
Lee, S-H. et al., Reversible Lithium-Ion Insertion in Molybdenum Oxide Nanoparticles, Adv. Mater. 2008, 20, 3627-3632.
Bates, J. B. et al., Thin-film lithium and lithium-ion batteries, Solid State Ionics 1999, 135, 33-45.
Long, J. W. et al., Three-Dimensional Battery Architectures, Chem. Rev. 2004, 104, 4463-4492.
Golodnitsky, D. et al., Progress in three-dimensional (3D) Li-ion microbatteries, Solid State Ionics 2006, 177, 26-32.
Hassoun, J. et al., High-Rate, Long-Life Ni—Sn Nanostructured Electrodes for Lithium-Ion Batteries, Adv. Mater. 2007, 19, 1632-1635.
Nam K.T., et al., Stamped microbattery electrodes based on self-assembled M13 viruses, Proc. Natl. Acad. Sci. USA 2008, 105, 17227-17231.
Shaijumon, M. M., et al., Synthesis of hybrid nanowire arrays and their application as high power supercapacitor electrodes, Chem. Comm. 2008, 20, 2373-2375.
Powers, R. A., Batteries for Low Power Electronics, Proc. IEEE 1995, 83, 687-693.
Nathan, M. et al., Three-Dimensional Thin-Film Li-Ion Microbatteries for Autonomous MEMS, J. Microelectromech Syst. 2005, 14, 879-885.
Cho Y. et al., Self-Assembling Colloidal-Scale Devices: Selecting and Using Short-Range Surface Forces Between Conductive Solids, Adv. Fund. Mater. 2007, 17, 379-389.
Dillon, A. C. et al., Metal oxide nano-particles for improved electrochromic and lithium-ion battery technologies, Thin Solid Films 2008, 516, 794-497.
Cheah, S. K. et al., Self-Supported Three-Dimensional Nanoelectrodes for Microbattery Applications, Nano Lett. 2009, 9, 3230-3233.
Hurst, S. J. et al., Multisegmented One-Dimensional Nanorods Prepared by Hard-Template Synthetic Methods, Angew. Chem. Int. Ed. 2006, 45, 2672-2692.
Cheng, F. et al., Template-Directed Materials for Rechargeable Lithium-Ion Batteries, Chem. Mater. 2007, 20, 667-681.
Bazin, L. et al., High rate capability pure Sn-based nano-architectured electrode assembly for rechargeable lithium batteries, J. Power Sources 2009, 188, 578-582.
Long, J. W. et al., Ultrathin, Protective Coatings of Poly(o-phenylenediamine) as Electrochemical Proton Gates: Making Mesoporous MnO2 Nanoarchitectures Stable in Acid Electrolytes, Nano Lett. 2003, 3, 1151-1161.
Rhodes, C. P. et al., Nanoscale Polymer Electrolytes: Ultrathin Electrodeposited Poly(Phenylene Oxide) with Solid-State Ionic Conductivity, J. Phys. Chem. B 2004, 108, 13079-13087.
Dewan, C. et al., Vanadia xerogel nanocathodes used in lithium microbatteries, J. Power Sources 2003, 119, 310-315.
Pushparaj, V. L. et al., Flexible energy storage devices based on nanocomposite paper, Proc. Nat. Acad. Sci. U.S.A. 2007, 104, 13574-13577.
Fu, L. J. et al., Surface modifications of electrode materials for lithium ion batteries, Solid State Sci. 2006, 8, 113-128.
Guo, K. et al., Will advanced lithium-alloy anodes have a chance in lithium-ion batteries?, J. Power Sources 1997, 68, 87-90.
Winter M., et al., Electrochemical lithiation of tin and tin-based intermetallics and composites, 1999, Electrochemical Acta, 45, 31-50.
Ulus, A. et al., Tin Alloy-Graphite Composite Anode for Lithium-Ion Batteries, J. Electrochem. Soc. 2002, 149, A635-A643.
Kim, T. J. et al., Enhanced electrochemical properties of SnO2 anode by AIPO4 coating, Electrochim. Acta 2004, 49, 4405-4410.
Lee, K. T. et al., Synthesis of Tin-Encapsulated Spherical Hollow Carbon for Anode Material in Lithium Secondary Batteries, J. Am. Chem. Soc. 2003, 125, 5652-5653.
Stjeradahl, M. et al., Surface chemistry of intermetallic Al Sb-anodes for Li-ion batteries, Electrochim. Acta 2007, 52, 4947-4955.
Ehinon, K. K. D. et al., Ni3Sn4 Electrodes for Li-Ion Batteries: Li—Sn Alloying Process and Electrode/Electrolyte Interface Phenomena, Chem. Mater. 2008, 20, 5388-5398.
Owen, J. R., Rechargeable Lithium Ion Batteries, Chem. Soc. Rev. 1997, 26, 259-267.
Sakamoto et al., Hierarchical battery electrodes based on inverted opal structures, J. Mater Chem., 2002, 12, 2859-2861.
Chamran et al., Fabrication of High-Aspect-Ratio Electrode Arrays for Three-Dimensional Microbatteries, J. Microelectromech Syst, 2007, 16, 844-852.
Min et al., Fabrication and properties of a carbon/polypyrrole three-dimensional microbattery, J. Power Sources, 2007, 178, 795-800.
Hassoun et al., Electrodeposited Ni—Sn intermetallic electrodes for advanced lithium ion batteries, J Power Sources, 2006, 160, 1336-1341.
Gowda et al., Conformal Coating of Thin Polymer Electrolyte Layer on Nanostructured Electrode Materials for Three-Dimensional Battery Application, Nano Letters, 2011, 11, 101-106.
Sander et al., Fabrication of High-Density, High Aspect Ratio, Large-Area Bismuth Telluride Nanowrie Arrays by Electrodeposition into Porous Anodic Alumina Templates, Adv. Mater., 2002, 14, No. 9, 665-667.
International Preliminary Report on Patentability for PCT/US2010/059946, mailed on Jun. 21, 2012.
International Search Report and Written Opinion for PCT/US2010/059946, mailed on Mar. 29, 2011.

CONFORMAL COATING ON NANOSTRUCTURED ELECTRODE MATERIALS FOR THREE-DIMENSIONAL APPLICATIONS

CROSS-REFERENCE TO RELATED PATENT APPLICATIONS

This application claims priority to: U.S. Patent Application Ser. No. 61/285,259, filed on Dec. 10, 2009, entitled "Conformal Coating Of Thin Polymer Electrolyte Layer on Nanostructured Electrode Materials For Three Dimensional Micro/Nanobattery Applications," which provisional patent application is commonly assigned to the assignee of the present invention and is hereby incorporated herein by reference in its entirety fix all purposes.

BACKGROUND

1. Field of the Invention

The present invention relates to conformal coating of a thin polymer electrolyte layer on nanostructured electrode materials for three-dimensional micro/nanobattery applications.

2. Background of the Invention

The reversible electrochemistry and the superior gravimetric and volumetric energy storage capacities of lithium ion batteries (LIB) have propelled them as the dominant power source for a range of portable electronic and vehicular applications. [Armand, M. et al., *Nature* 2008, 451, 652-657; Whittingham, M. S., *Chem. Rev.* 2004, 104, 4271-4301; Van Schalkwijk, W., et al. *Advances in Lithium-Ion Batteries* (Kluwer Academic/Plenum, New York) 2002] But the sluggish rate of charge/discharge remains one of the major challenges plaguing the LIB industry to date. Current LIBs suffer slow rates of charge/discharge because of (i) slow diffusivity constants of Li ions in most of the electrode materials, (ii) large separator thickness of the order of 20 μm, and (iii) slow electron transport due to large micrometer sized electrode materials. A plethora of recent research efforts have tried addressing these drawbacks of the present day LIBs. [Taberna, P. L., et al., *Nat. Mater.* 2006, 5, 567-573 ("Taberna 2006"); Chung, S. Y., et al., *Nat. Mater.* 2002, 1, 123-128; Li, N. et al., *Electrochem. Solid-State Lett.* 2000, 3, 316-318; Aricò, A. S. et al., *Nat. Mater.* 2005, 4, 366-377 ("Aricò 2005"); Reddy, A. L. M. et al., *Nano Lett.* 2009, 9, 1002-1006 ("Reddy 2009"); Endo, M. et al., *Carbon* 1999, 38, 183-197; Lee, S-H. et al., *Adv. Mater.* 2008, 20, 3627-3632]

Shorter Li ion diffusion paths have been achieved by fabricating thin film electrodes. [Bates, J. B., et al., *Solid State Ionics* 1999, 135, 33-45] This has led to a significant increase in charge/discharge rates. Yet the thin film technology has the major drawback of possessing lower energy densities. Hence, current research has focused on assembling the entire batter (current collector, anode, solid polymer electrolyte, cathode) in the 3D nanostructured architecture and several designs have been proposed. [Long, J. W., et al., *Chem. Rev.* 2004, 104, 4463-4492 ("Long 2002")] 3D design offers marked improvements in energy and power density especially with respect to the geometric foot print of the device. [Long 2002] Efficient means of energy storage with a smaller areal footprint has been the focus of many researchers in the recent past. [Golodnitsky, D., et al., *Solid State Ionics* 2006, 177, 26-32 ("Golodnitsky 2006"); Hassoun, J., et al., *Adv. Mater.* 2007, 19, 1632-1635 ("Hassoun 2007"); Nam, K. T., et al., *Proc. Natl. Acad. Sci. USA* 2008, 105, 17227-17231; Shaijumon, M. M., et al., *Chem. Comm.* 2008, 20, 2373-2375; Powers, R. A., *Proc. IEEE* 1995, 83, 687-693; Nathan, M., et al., *J. Microelectromech Syst.* 2005, 14, 879-885 ("Nathan 2005"); Cho, Y. K., et al., *Adv. Funct. Mater.* 2010, 17, 379-389; Dillon, A. C. et al., *Thin Solid Films* 2008, 516, 794-497]

Hence a redesign from the existing multi-component assembly to a completely new design of 3D nanoarchitectured electrodes with inter-penetrating or conformal assembly, [Long 2002; Cheah, S. K., et al., *Nano Lett.* 2009, 9, 3230-3233; U.S. patent application Ser. No. 11/372,286, entitled "Electrodeposition of a Polymer Film as a Thin Film Polymer Electrolyte for 3D Lithium Ion Batteries," filed Aug. 27, 2007, inventors Madou M. J., et al.] separated by a thin electrolyte/separator will be essential to meet both energy and power requirements.

Nanostructured electrode materials due to their high surface area and superior electronic conductivity can be considered as potential candidates for the construction of 3D batteries. [Aricò 2005; Reddy 2009] The majority of the prior research efforts in 3D designs have been limited to the microstructured (~40 μm pore size) battery architecture. [Golodnitsky 2006; Nathan 2005] Amongst the several methods available for synthesis of nanowire electrodes, template assisted synthesis has been shown to be a simple and versatile technique with excellent control over nanowire dimensions, [Hurst, S. J., et al., *Angew. Chem. Int. Ed.* 2006, 45, 2672-2692; Chong, F., et al., *Chem. Mater.* 2007, 20, 667-681] Conformal coating of electrode materials around nanostructured current collectors pioneered by Simon and co-workers [Taberna 2006; Bazin, L., et al., *J. Power Sources* 2009, 188, 578-582], have shown fast rates of charge and discharge maintaining high energy densities.

However, achieving uniform coatings of separator/electrolyte units around nanostructured electrode materials has been challenging and the reports addressing the same are limited. [Long, J. W., et al., *Nano Lett.* 2003, 3, 1151-1161 ("Long 2003"); Rhodes, C. P., et al., *J. Phys. Chem. B* 2004, 108, 13079-13087 ("Rhodes 2004")] One method which is gaining focus is the self limiting electrodeposition of non-conducting polymers such as Poly(phenylene)oxide (PPO) around nanostructured electrodes. Long 2003; Rhodes 2004. The above method of coating polymers by electrodeposition requires extremely inert conditions to attain reliable conformal coatings around the electrode material. The other simple, established technique of coating polymer layers on electrode materials is by spin/drop coating. [Dewan, C., et al. *J. Power Sources* 2003, 119, 310-315; Pushparaj, V. L., et al., *Proc. Nat. Acad. Sci. U.S.A.* 2007, 104, 13574-13577] Such polymer coatings not only serve as the separator/electrolyte functionality but also could help in controlling and forming stable solid electrolyte interphase (SEI) film formation on the high surface area nanostructured electrodes. [Fu, L. J., et al., *Solid State Sci.* 2006, 8, 113-128 ("Fu 2006"); Balbuna, P. B., et al., *Lithium-Ion Batteries Solid-Electrolyte Interphase*, Imperial College Press, London 2004; Guo, K., et al., *J. Power Sources* 1997, 68, 87-90] SEI film formation and stability influence irreversible capacity loss and cycling characteristics of Li ion battery electrodes. [Fu 2006; Winter, M., et al., 1999, 45, 31-50 ("Winter 1999")] The use of appropriate electrolyte for the active material, carbon coatings/composites, surface modification of electrode have included some of the efforts to address this issue. [Fu 2006; Ulus, A. et al., *J. Electrochem. Soc.* 2002, 149, A635-A643; Kim, T.-J., et al., *Electrochim. Acta* 2004, 49, 4405-4410; Lee, K. T., et al. *J. Am. Chem. Soc.* 2003, 125, 5652-5653] Hence there exists a need for innovative approaches to control the SEI formation on high volume expansion intermetallic [Stjerndahl, M., et al., *Electrochim. Acta* 2007, 52, 4947-4955 ("Stjerndahl 2007"); Ehinon, K. K.

D., et al., *Chem. Mater.* 2008, 20, 5388-5398 ("Ehinon 2008")] based electrode materials.

SUMMARY OF THE INVENTION

The present invention relates to three-dimensional batteries. Planar lithium ion batteries used in the present day technology have a major drawback of slow lithium ion kinetics. To achieve faster lithium ion kinetics a large sacrifice in the mass loaded per unit area has to be made. The three-dimensional nanostructured architecture developed in this invention improves Li ion kinetics in the cell and also allows for larger capacities per unit area. This is the first demonstration of coating thin polymer electrolyte layers in a conformal fashion around each individual anode nanowire and its subsequent use as an efficient 3D lithium ion battery. This thin layer of polymer gel electrolyte allows for fast lithium ion diffusion across the electrodes in contrast to the thicker and planar polymer films used in existing lithium ion battery technology.

In general, in one aspect, the invention features a method that includes electrodepositing nanowires into pores of a template. The nanowires are individual nanostructured electrodes. The method further includes widening the pores of the template. The method further includes that, after widening the pores of the template, infiltrating a polymer solution onto the template to obtain a polymer layer around the nanowires and yielding an anode-polymer electrolyte core-shell assembly.

Implementations of the invention can include one or more of the following features:

The method can further include operatively connecting a cathode to the anode-polymer electrolyte core-shell assembly to fabricate a three-dimensional battery.

The nanowires can include an anode material that is Ni—Sn, $TiO_2$, $MnO_2$, $Fe_3O_4$, $V_2O_5$, carbon nanotubes, Si, $LiCoO_2$, $LiFePO_4$, or a combination thereof.

The nanowires can be intermetallic nanowires.

The intermetallic nanowires can be a combination of metallic elements that is Cu—Sb, Cu—Sn, Ti—Si, Al—Sb, Sn—Sb, Ni—Si, or a combination thereof.

The nanowires can be Ni—Sn nanowires.

The nanowires can include an oxide material. The oxide material can be $MnO_2$, $TiO_2$, $V_2O_5$, $Fe_3O_4$, CuO, CoO, or a combination thereof.

The template can be an alumina template.

The step of infiltration can include a step of spin coating.

The step of widening the pores of the template can include using a solution of NaOH.

The polymer solution can include a polymer that is polymethylmethacralate, polyethylene oxide, polyvinyldiflouride, polyacrylonitrile, or a combination thereof.

The polymer solution can include polymethylmethacralate in acetonitrile.

The method can further include soaking the polymer layer around the nanowires in $LiPF_6$. The $LiPF_6$ can be $LiPF_6$ in solution, such as 1M $LiPF_6$ in solution. The solution can be a solution of ethylene carbonate and dimethyl carbonate, such as a 1:1 solution of ethylene carbonate and dimethyl carbonate.

The cathode can include a cathode material that is $LiCoO_2$ or lithium foil.

The polymer layer around the nanowires can have a uniform thickness.

The polymer layer around the nanowires can have a thickness between about 20 and about 100 nm.

The polymer layer around the nanowires can have a thickness between about 20 and about 30 nm.

In general, in another aspect, the invention features an assembly fabricated by any of the methods described above.

In general, in another aspect, the invention features a nanostructured battery fabricated by any of the methods described above.

In general, in another aspect, the invention features a nanostructured battery that includes an anode-polymer electrolyte core shell assembly and a cathode operatively connected to the anode-polymer electrolyte core shell assembly. The anode-polymer electrolyte core shell assembly includes a template having pores, nanowires in the pores of the template, and a polymer layer around the nanowires.

Implementations of the invention can include one or more of the following features:

The nanostructure battery can be a three-dimensional nanostructured battery.

BRIEF DESCRIPTION OF THE DRAWINGS

For a detailed description of the preferred embodiments of the invention, reference will now be made to the accompanying drawings in which:

FIG. 1A is an SEM image showing uniform diameter of the Ni—Sn nanowires obtained after dissolving the AAO template. FIG. 1B is an EDX spectra of Ni—Sn nanowire confirming the presence of elements Ni and Sn.

FIG. 3A is a schematic showing the fabrication of the novel nanostructured conformal configuration of the electrode/separator assembly. FIG. 3B. is a TEM image of the conformal configuration showing the conformal PMMA layer (~25 nm) around a ~3 μm long segment of a Ni—Sn nanowire.

FIG. 5A is a schematic showing the fabrication of the nanostructured 1D and 3D configuration of the electrode/separator assembly. FIG. 5B is a TEM image of the 3D configuration showing the conformal PMMA layer (~25 nm) around the Ni—Sn nanowire. FIG. 5C is a TEM image of the 1D configuration showing the planar heterojunction between the Ni—Sn and PMMA segments.

FIG. 6A is a graph showing the variation in voltage versus the capacity per footprint area for the planar Ni—Sn/PMMA electrode/electrolyte configuration cycled at a rate of 0.12 mA/cm$^2$ between 1.5 V and 0.02 V versus Li/Li$^+$ using PMMA separator soaked in 1M solution of $LiPF_6$ in 1:1 (v/v) mixture of ethylene carbonate (EC) and dimethyl carbonate (DMC) as the electrolyte. FIG. 6B is a graph showing the variation in voltage versus capacity per footprint area for the conformal Ni—Sn/PMMA electrode/electrolyte configuration cycled at a rate of 0.12 mA/cm$^2$ between 1.5 V and 0.02 V versus Li/Li$^+$ using PMMA separator soaked in 1M solution of $LiPF_6$ in 1:1 (v/v) mixture of ethylene carbonate (EC) and dimethyl carbonate (DMC) as the electrolyte. FIG. 6C is a graph comparing the cycling behavior of the planar configuration (curve 603) and conformal configuration (curve 604). The conformal configuration showed a reversible capacity of 0.26 mAh/cm$^2$ after 30 cycles of charge/discharge which was two orders of magnitude greater than the capacity delivered by the planar design.

FIG. 7A is a graph comparing the rate capability of the planar and conformal configuration. Curve 701 (shown by the circles) and curve 702 (shown by the squares) correspond to the conformal configuration cycled at 0.12 mA/cm$^2$ and 0.3 mA/cm$^2$, respectively. Curve 703 (shown by the circles) and curve 704 (shown by the squares) correspond to the planar configuration cycled at 0.12 mA/cm$^2$ and 0.3 mA/cm$^2$ respectively. FIG. 7B is a graph comparing the cycling behavior of Ni—Sn/PMMA core/shell nanowire with different lengths of the Ni—Sn nanowire (10 μm of curve 705 and 6 μm of curve 706). Reversible capacities of ~0.4 mAh/cm$^2$ (10 μm Ni—Sn) and ~0.2 mAh/cm$^2$ (6 μm Ni—Sn) were observed after 15 cycles of charge/discharge.

FIG. 13A is a schematic of full Li-ion cell. FIG. 13B shows charge-discharge profiles for Ni—Sn/PMMA gel/LiCoO$_2$ configuration (Ni—Sn nanowire length ~10 μm) cycled at a rate of 0.05 mA/cm$^2$ between 2.7 V and 3.95 V using PMMA separator soaked in liquid electrolyte of 1M solution of LiPF$_6$ in 1:1 (v/v) mixture of ethylene carbonate (EC) and dimethyl carbonate (DMC).

DETAILED DESCRIPTION

Figure 1:
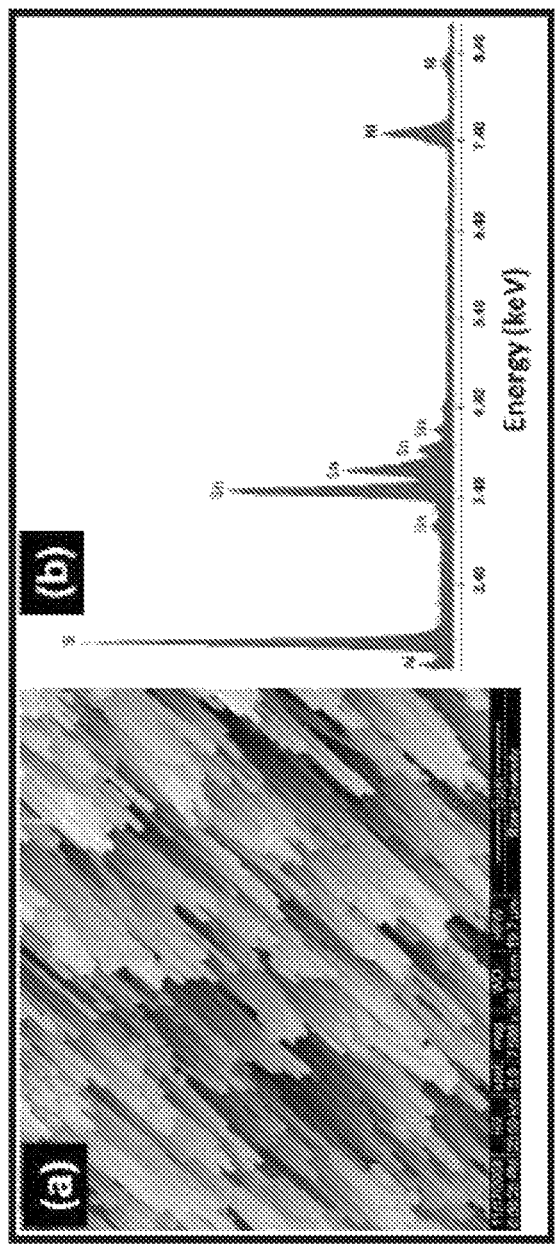
FIGS. 1A-1B show the textural and elemental characterization of Ni—Sn nanowires grown by electrodeposition that can be used in embodiments of the present invention.

The present invention includes a template assisted technique to fabricate nanoarchitectured conformal electrode/electrolyte assembly that is and can be useful in Li-ion micro/nanobattery systems. Thin conformal layer of PMMA deposited around Ni—Sn nanowire electrode provide the separator functionality to the assembly and serve as the gel electrolyte when soaked with liquid electrolyte. The conformal configuration of the present invention has showed excellent electrochemical performance with two orders of magnitude improvement in the reversible discharge capacities, compared to its planar counterpart. High rate capability over extended cycling resulting from the nanoarchitectured conformal electrode-electrolyte assembly has also been demonstrated. The PMMA coating has been observed to stay intact around the Ni—Sn nanowires over extended cycling at high current rates and has shown to improve the cycling characteristics of the bare nanowires. It is believed that the present invention could easily be extended to deposit other active electrode materials and polymer separators (such as TiO$_2$, MnO$_2$, Fe$_3$O$_4$, V$_2$O$_5$, carbon nanotubes, Si, LiCoO$_2$, LiFePO$_4$) which could lead to the development of even further efficient nanoscale Li ion batteries. The conformal configuration of the PMMA coated electrode of the present invention is an important step towards realizing the true 3D nanostructured battery where the anode, electrolyte and cathode are all conformally integrated into the single nanowire assembly.

The present invention includes the fabrication of a conformal layer of uniform thickness (such as around 20 nm to around 30 nm thick) of Polymethylmethacralate (PMMA) (separator/gel electrolyte) around individual nanostructured electrode (Ni—Sn intermetallic nanowire) using a hard template assisted polymer infiltration technique (such as drop coating). The nanostructured conformal configuration of the gel electrolyte has led to improved rate capabilities and discharge capacities of the electrode per footprint area (footprint area: overall device area) compared to its planar (stacked layers as used in bulk technologies) counterpart.

Thin (less than about 100 nm, and more generally, less than about 30 nm) conformal layers of polymer (acting as both separator and electrolyte) have been coated around individual nanowire electrode materials using the alumina template based approach. This three-dimensional design for lithium ion batteries has improved rate capabilities and discharge capacities.

Such a fabrication process is advantageous because it is relatively inexpensive, as compared to other fabrication techniques and also is readily adaptable in large scale production.

Such fabrication process is also capable of uniformly coating over a relatively large length of a nanowire. Embodiments of the present invention have been produced for coated Ni—Sn nanowires uniformly coated over a length of around 12 μm.

The core-shell anode-electrolyte array was fabricated using alumina templates. The two layers were grown using a combination of electrodeposition and solution wetting techniques. A variety of anode materials were fabricated by electrodeposition in alumina templates followed by a pore widening step. The space around individual anode nanowires was filled by polymer layer using a solution wetting technique. Vertically aligned arrays of core-shell anode-electrolyte nanowires were obtained and characterized by electron microscopy techniques. The three-dimensional nanostructured assembly for the anode and electrolyte was electrochemically characterized by cyclic voltammetry and charge discharge analysis in vacuum tight Swagelok cells. Full cells were constructed using known cathode materials (LiCoO$_2$, V$_2$O$_5$) and electrochemically characterized against the novel 3D anode-separator nanocomposites.

The thin layer of polymer soaked in liquid electrolyte (which served the role of both the separator and gelled electrolyte) prevented dendrite formation and improved rate characteristics of the electrochemical cells. The conformal nature of the polymer coating around every individual nanowire led to shorter Lithium ion diffusion distances in the electrode which resulted in enhanced rate capabilities. The 3D configuration helped in minimizing power losses compared to the planar configuration due to the reduced separation distance between the electrode and electrolyte. Also, significant enhancement in discharge capacities per footprint area was achieved by growing longer nanowires. Individual anode-polymer electrolyte core-shell nanowires can be used as building blocks for nanowire battery devices. With the unique ability to obtain high rate and capacity, the 3D battery configuration could also be useful for high power applications, such as electric vehicles and electronic devices.

In one embodiment, the invention can include the following steps:
A. Ni—Sn nanowires (anode) are electrodeposited into the pores of a WHATMAN alumina template.
B. A dilute solution of NaOH is used to partially widen the pores of the alumina template from (A).
C. A solution of polymethylmethacralate in acetonitrile is prepared in an argon filled glove box.
D. The solution from (C) is spin coated onto the alumina template from (B) to obtain a thin polymer layer around the anode.
E. The polymer layer is soaked in a 1M $LiPF_6$ in 1:1 solution of ethylene carbonate and dimethyl carbonate.
F. The full and half cell were assembled against $LiCoO_2$ and Lithium foil respectively in an Argon filled glove box.

Electrochemical performance of the cells from (F) were studied using cyclic voltammetry and galvanostatic charge discharge analysis.

In this embodiment, polymer layers of thickness between around 20 to 100 nm were well suited. The thickness of the polymer layer achieved may be limited by the interpore distances of the commercial WHATMAN alumina templates used for this embodiment. Thicker polymer layers can be achieved using lab-grown alumina templates with larger interpore distances which in turn allows for larger widening of pores.

In alternative embodiments, various anode materials (like $TiO_2$, $MnO_2$, and carbon nanotubes) with different polymer layers (like polyethylene oxide, polyvinyldiflouride and polyacrylonitrile) can be engineered to build the novel three-dimensional core shell nanowires. Cathode materials with different rate of lithium ion diffusion can also be used to construct full cells against the anode-polymer electrolyte core-shell assembly.

Fabrication of Assembly

Owing to its high specific capacity, low cost and easy fabrication Ni—Sn intermetallic nanowires have been chosen as the exemplar electrode material for embodiments of the present invention. [Hassoun, J., et al., *J Power Sources* 2006, 160, 1336-134 ("Hassoun 2006")] Other intermetallic nanowires can be utilized as the electrode material in other embodiments of the present invention. Such other intermetallic nanowires include nanowires such as one of the following combinations of metallic elements: Cu—Sb, Cu—Sn, Ti—Si, Al—Sb, Sn—Sb, or Ni—Si; or a combination thereof. Apart from intermetallics, the nanowires can also be an oxide material, such as $MnO_2$, $TiO_2$, $V_2O_5$, $Fe_3O_4$, CuO, CoO, or a combination thereof.

Figure 2:
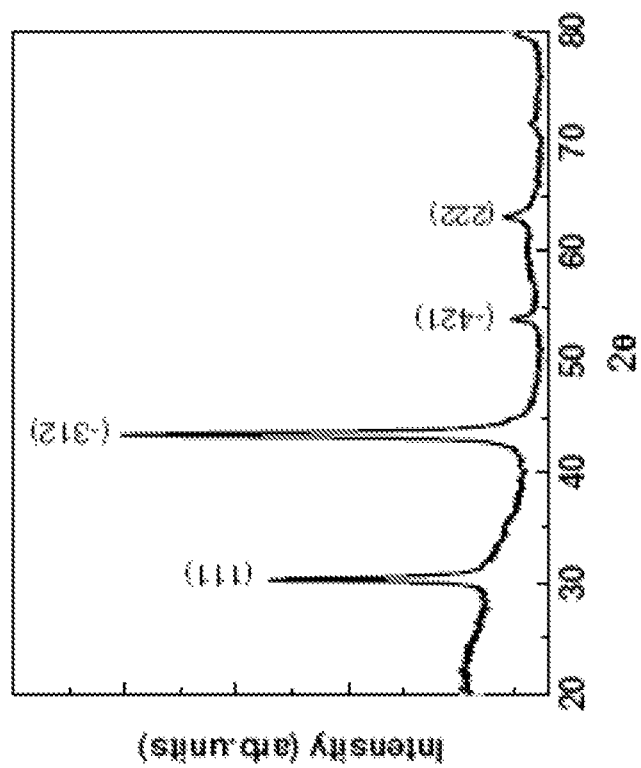
FIG. 2 shows X-ray diffraction patterns of the Ni—Sn obtained in the Ni—Sn nanowires grown. The diffraction patterns were recorded at room temperature with a Cu $K_\alpha$ radiation ($\lambda=1.5405$ Å) at a scan rate of 0.05 degree/min.

For embodiments of the present invention, Ni—Sn nanowires were grown inside pores of an anodized alumina template using a galvanostatic electrodeposition method. Alumina templates (such as ANODISC 13 from WHATMAN) having an average pore diameter of around 200 nm were used. A thin (200 nm) copper layer was sputtered onto the branched side of the alumina template that served as the electrical contact for the electroposition of nanowires. An aqueous solution of 0.2M $CuSO_4$ and 0.1M $H_3BO_3$ was prepared for the electrodeposition of Copper nanorod current collectors. A 20 mL aqueous solution of 0.075M $NiCl_2$, 0.175M $SnCl_2$, 0.5M $K_4P_2O_7$, 0.125M Glycine and 5 mL $L^{-1}$ $NH_4OH$ was prepared for the electrodeposition of Ni—Sn nanowires. [Hassoun 2006] The electrodepositions were carried out in a three electrode cell consisting of Pt counter electrode, Ag/AgCl reference electrode and the Au-coated alumina template working electrode using an AUTOLAB PGSTAT 302N potentiostat/galvanostat. First, a short copper nanorod current collector segment was grown potentiostatically at –0.7V for 90 s. The alumina template was removed from the cell and cleaned with large amounts of DI water followed by drying in vacuum for 4 hours. After drying, the Ni—Sn nanowires were electrodeposited using a galvanostatic method at a current density of 6 mA/cm$^2$, typically for 30 minutes to partially fill the alumna template. Morphological and structural characterization of the Ni—Sn nanowires is shown in FIGS. 1A-1B and 2. FIG. 1A is an SEM image showing uniform diameter of the Ni—Sn nanowires obtained after dissolving the AAO template. FIG. 1B is an EDX spectra of Ni—Sn nanowire confirming the presence of elements Ni and Sn. FIG. 2 shows X-ray diffraction patterns of the Ni—Sn obtained in the Ni—Sn nanowires grown.

A copper foil (Nimrod Hall Copper foil company) of thickness 0.025 mm was used as the substrate for electrodeposition of the planar Ni—Sn film. The same Ni—Sn electrolyte solution as used for the nanowire growth was used to grow planar films on the copper foil current collector. The copper foil was cleaned thoroughly with DI water before electrodeposition. Using the same three electrode setup as used for the Ni—Sn nanowire growth, planar Ni—Sn bulk film was grown on the copper foil to obtain films of same thickness.

Spin coating or drop coating followed by wiping the excess solution on the surface of the template was used to coat a thin layer of PMMA onto the Ni—Sn electrode for the planar and conformal configuration respectively.

Using a combination of the above two techniques to grow nanostructured electrode and electrolyte/separator materials in the alumina template, the conformal configuration has been realized for the electrode-electrolyte assembly. FIG. 3A is a schematic showing the fabrication of the novel nanostructured conformal configuration of the electrode/separator assembly. As shown in FIG. 3A, a gold-back coated template 302 can be utilized. Nanowires are electrodeposited into pores of the template 302 as shown in assembly 303. The nanowires can function as individual nanostructured electrodes. The pores are then widened, as shown in assembly 304. A polymer is then infiltrated, such as by drop coating a polymer solution onto the assembly 304 to obtain a polymer layer around the nanowires and yielding a nanostructured conformal hybrid assembly 305.

Drop coating of PMMA layer onto the pore-widened alumina template results in a 3D conformal configuration. As shown in FIG. 3B, electron microscopy images of the conformal configurations show the well developed interfaces between the electrode and the polymer electrolyte/separator. This shows the conformal PMMA layer (~25 nm) around a ~3 µm long segment of a Ni—Sn nanowire. Generally, in embodiments of the present invention, the polymer layer is uniform in thickness, in the range from about 20 to about 30 nm. The high resolution image (inset 301) shows a good interface between the thin PMMA layer around the Ni—Sn nanowire. A schematic of single conformal Ni—Sn/PMMA nanowire assembly is also shown. Thickness of PMMA layer can be controlled by tuning the alumina pore-widening step.

Figure 4:
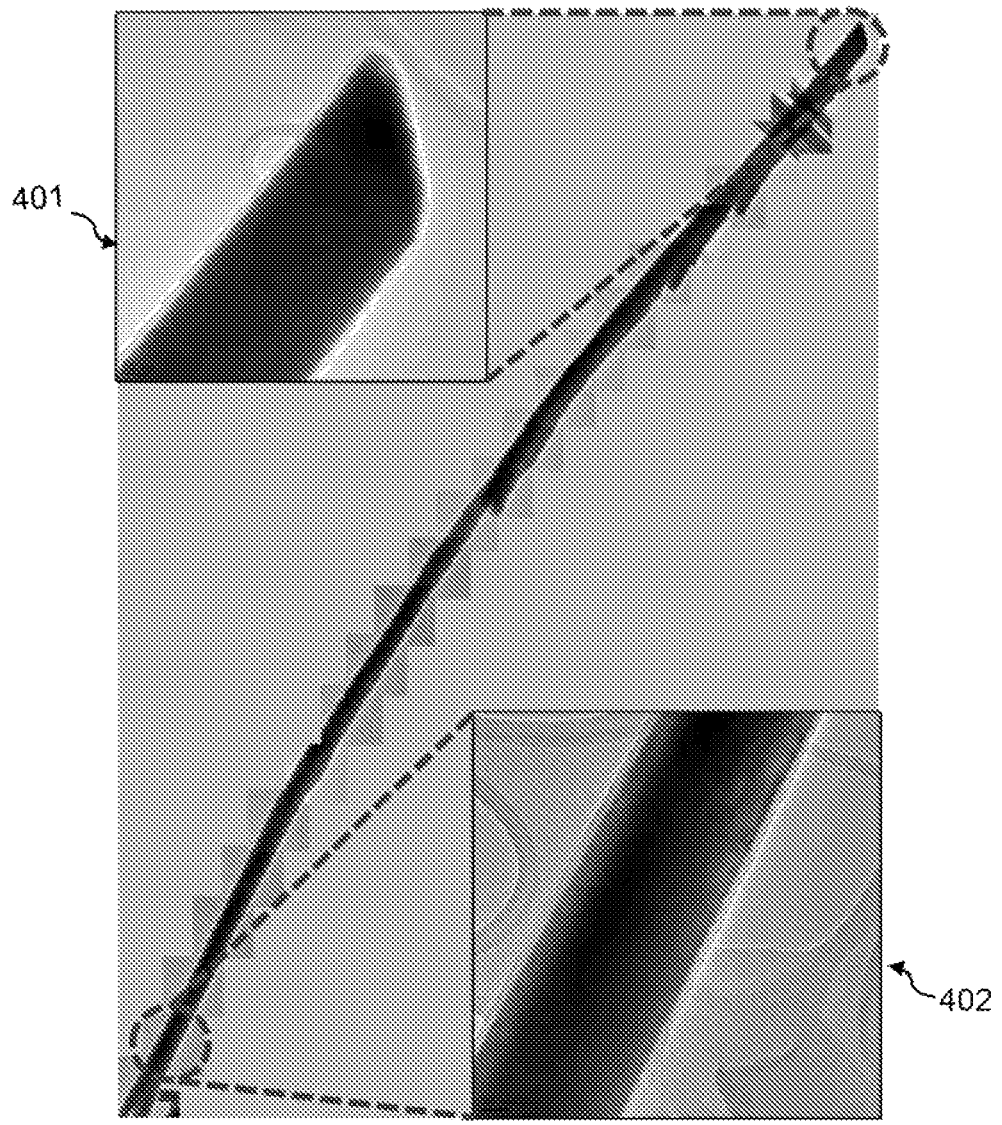
FIG. 4 is a TEM image of a 10 μm long PMMA coated Ni—Sn nanowire.

As shown in FIG. 4, an entire nanowire was visualized at 24 continuous segments by TEM to confirm the conformal nature of the coating along the length of the nanowire. High magnification images at two different segments of the nanowire (segments 401 and 402) shows the Ni—Sn/PMMA interface.

Figure 3:
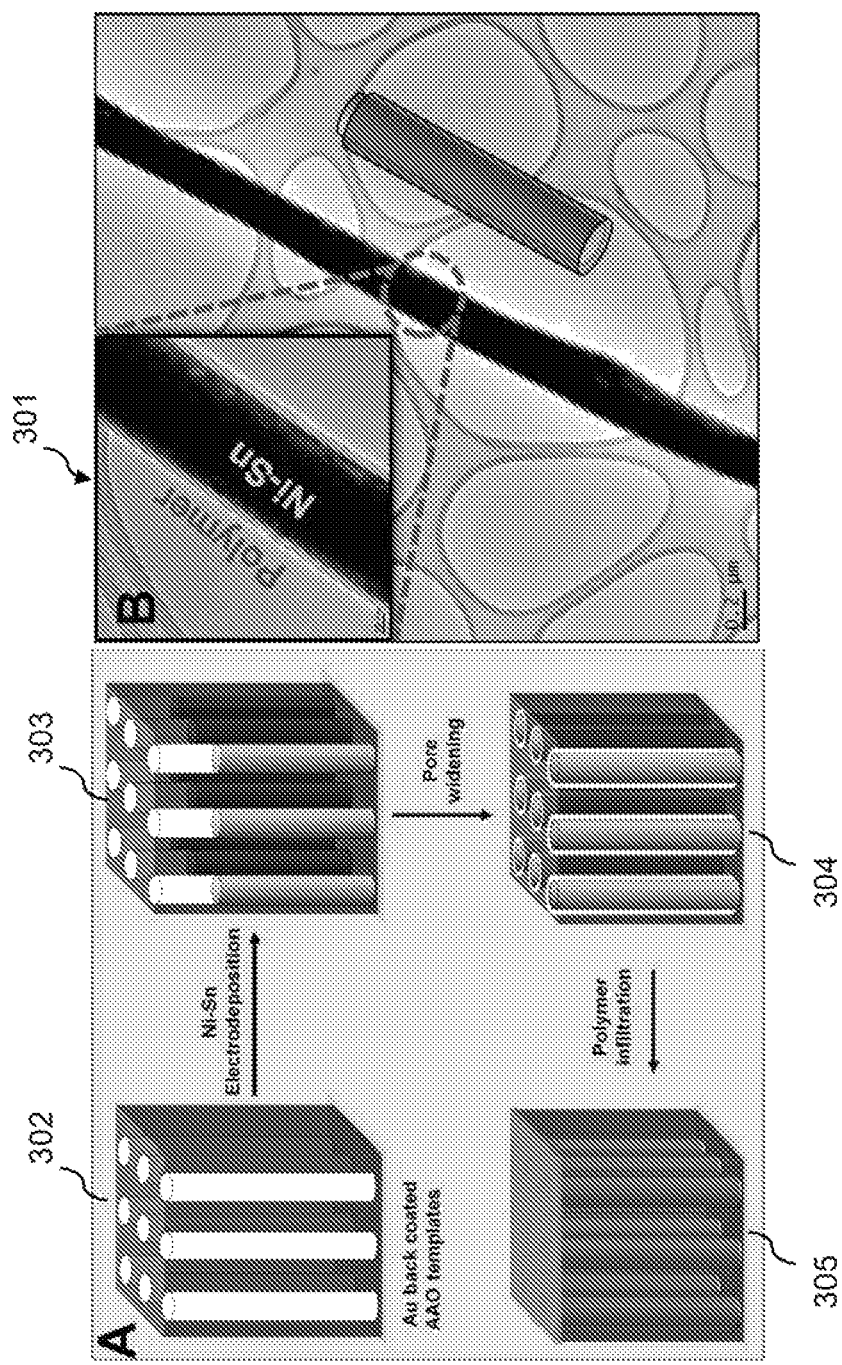
FIGS. 3A-3B shows the fabrication of nanostructured conformal Ni—Sn/PMMA hybrid assembly.
Figure 5:
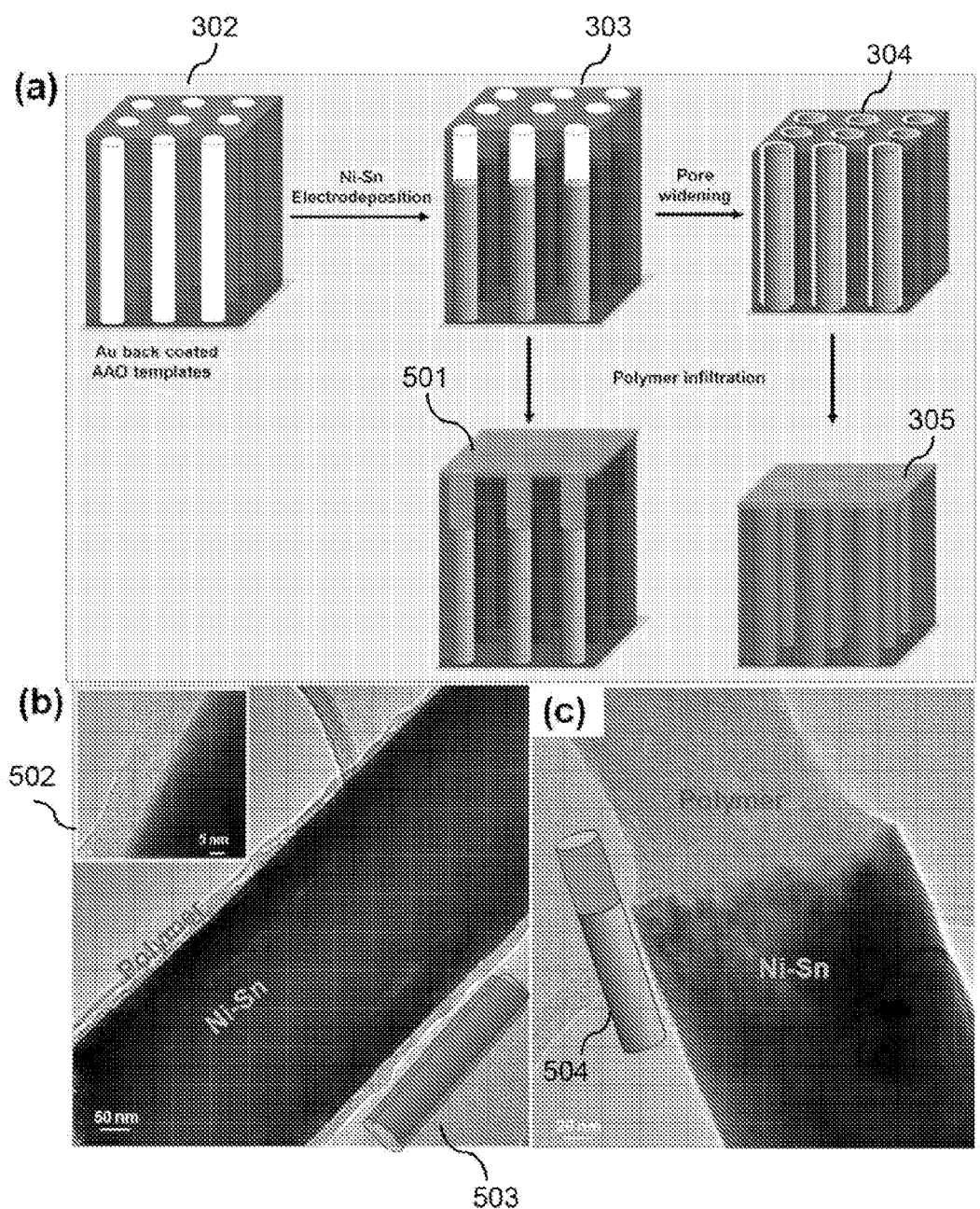
FIGS. 5A-5C shows the fabrication of nanostructured Ni—Sn/PMMA hybrid assembly.

FIG. 5A a schematic showing the fabrication of the novel nanostructured conformal configuration of the electrode/separator assembly similar to that shown in FIG. 3, except that it further illustrates performing the polymer infiltration step directly assembly 303 (i.e., not including the pore widening step). Thus, sequential filling of PMMA in the Ni—Sn nanowire grown template results in the fabrication of 1D assembly, while spin-coating of PMMA layer onto the pore-widened alumina template results in 3D conformal configuration.

FIG. 5B is a TEM image of the 3D configuration (i.e., the "conformal configuration") showing the conformal PMMA layer (~25 nm) around the Ni—Sn nanowire. Similar to as shown in FIG. 3B, the high resolution image (inset 502) of FIG. 5B shows a good interface between the thin PMMA layer around the Ni—Sn nanowire. A schematic of a single 3D Ni—Sn/PMMA nanowire assembly 503 is also shown. Again, the thickness of PMMA layer can be controlled by tuning the alumina pore-widening step. FIG. 5C is a TEM image of the 1D configuration (i.e., "multisegmented configuration") showing the planar heterojunction between the Ni—Sn and PMMA segments. A schematic of a single multisegmented Ni—Sn/PMMA nanowire FIG. 5C is a TEM image of the 1D configuration showing the planar heterojunction between the Ni—Sn and PMMA segments. Schematic of a single multisegmented Ni—Sn/PMMA nanowire 504 is also shown.

The conformal nature of the PMMA coating around the nanowires was observed for all the Ni—Sn nanowires imaged using TEM. The conformal configuration resulted in a core-shell nanostructure and had much higher interfacial area compared to the conventional planar configuration. This lead to an electrode volume gain and allowed for direct access of Li ions to the entire surface of the cylindrical nanowires. In the case of the planar configuration, Li ion transport occurred only across the planar interface between the electrode and electrolyte. Hence, the conformal configuration of electrode-electrolyte assembly exhibited superior electrochemical properties compared to the respective planar thin film based configuration.

Testing

Ni—Sn/PMMA electrode-electrolyte assemblies with planar (i.e., 2D) and conformal (i.e., 3D) nanostructured configurations were tested for their electrochemical performance in Li half cells by Galvanostatic charge/discharge cycling between 1.5 V and 0.02 V versus Li/Li$^+$, with Ni—Sn as the working electrode. Conformal PMMA layer soaked in liquid electrolyte solution formed the gel electrolyte and separator. For the conformal nanostructured electrode-electrolyte configuration, nanowires of height 10 µm were electrodeposited in the AAO templates and for the planar configuration a film of same thickness was electrodeposited on a copper foil.

For this testing the planar and conformal Ni—Sn/PMMA nanostructures were fabricated as follows: After the growth of the Ni—Sn (electrode) nanowires and bulk film, the PMMA based polymer electrolyte/separator was coated onto the electrode. A 2 wt % solution of PMMA in acetonitrile was prepared inside an Argon filled glove box. The PMMA electrolyte was coated onto the Ni—Sn nanowires to obtain two different electrode-electrolyte designs. A thin film of PMMA was coated onto the planar Ni—Sn bulk film by spin coating to obtain the 2D electrode-electrolyte architecture. For the conformal configuration, the Ni—Sn grown AAO template was typically first treated with 0.1 M NaOH for 40 minutes to widen the pores of the template. After the pore widening process the PMMA was drop coated onto the alumina template. After the coating process the template surface was wiped off the excess liquid using a clean tissue paper and dried in vacuum at 25° C. for 1 h. A thin film of PMMA was allowed on top of the template to ensure electrical insulation between the two electrodes. The Structure of the conformal configuration was analyzed by Transmission electron microscopy (FEI Quanta 400 ESEM FEG, JEOL 2100F). The template was dissolved completely in 3M NaOH to release individual nanowires prior to the electron microscopy characterization.

The electrochemical performance of the Ni—Sn/PMMA core-shell nanowires was tested by galvanostatic charge/discharge measurements. For the half cell measurements, an electrochemical test cell was assembled in a Swagelok-type cell inside an Argon-filled glovebox using the Ni—Sn/PMMA (planar and conformal configurations) electrode/separator unit as the working and lithium metal foil as the counter/reference electrode. For full cell measurements, the cathode was made of LiCoO$_2$ (SIGMA ALDRICH), carbon black and PVDF binder in the weight ratio of 85:10:5. The slurry was prepared by mixing the above mixture of LiCoO$_2$, carbon black and PVDF in Dimethylformamide thoroughly, followed by casting onto an Aluminium foil (Alfa Aesar, thickness of 0.1 mm). The coated cathode was dried in a vacuum oven at 120° C. for 24 hours. The conformal nanostructured Ni—Sn/PMMA array was used as anode/separator unit against the LiCoO$_2$ cathode. The PMMA film was soaked in 1 M solution of LiPF$_6$ in 1:1 (v/v) mixture of ethylene carbonate (EC) and dimethyl carbonate (DMC) for 1 hour prior to assembly of each of the electrochemical cells. All galvanostatic charge/discharge measurements were conducted using an ARBIN BT 2000 Battery Analyzer. The electrochemical measurements of the uncoated Ni—Sn nanowires were performed in a Swagelok-type cell using Ni—Sn nanowires as the working electrode, Li metal foil as a counter/reference electrode and 1M solution of LiPF$_6$ in 1:1 (v/v) mixture of ethylene carbonate (EC) and dimethyl carbonate (DMC) as an electrolyte. A glass microfiber filter was used as the separator. The cells were charged and discharged at a rate of 0.12 mA/cm$^2$ between 1.5 V and 0.02 V versus Li/Li+.

Figure 6:
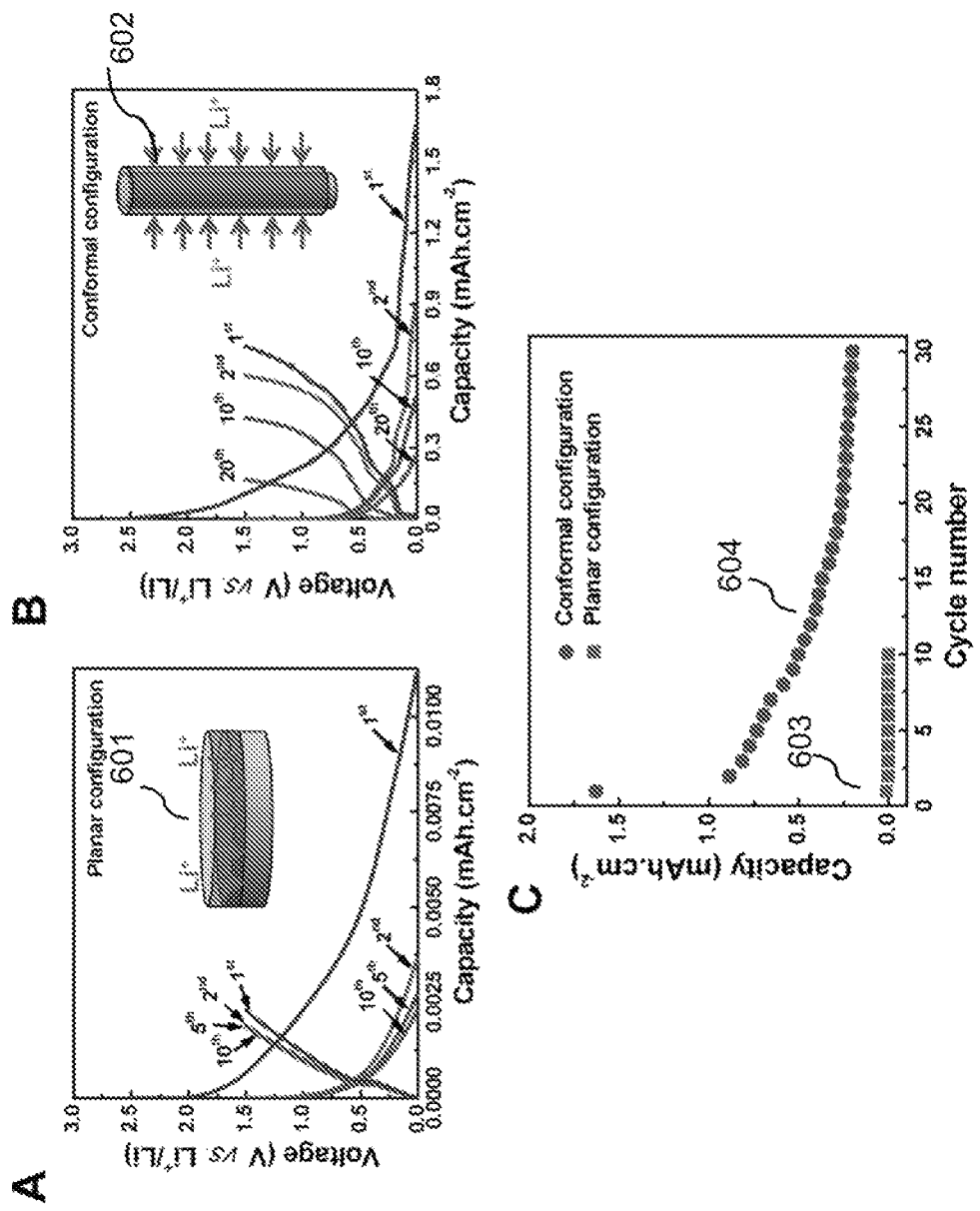
FIGS. 6A-6C show the electrochemical performance of a Ni—Sn/PMMA assembly in planar (2D) and conformal (3D) configurations, galvanostatically cycled in Li-half cells.

The potential versus capacity curves for the two electrode-electrolyte configurations (shown in FIGS. 6A-6B) at a current rate of 0.12 mA/cm$^2$ show typical Li insertion/extraction behavior of tin based intermetallic anodes. Inset 601 in FIG. 6A is a schematic of the planar configuration with the arrows indicating direction of Li ion transport. Li ion transport in these configurations has been schematically illustrated in the respective plots. (Inset 602 in FIG. 6B is a schematic of the core-shell morphology of individual nanowires in the conformal configuration with the radial direction of Li ion transport.)

The capacity per unit area of the conformal configuration was higher than that for the planar counterpart. FIG. 6C is a graph comparing the cycling behavior of the planar configuration (curve 603) and conformal configuration (curve 604).

The thin film based planar configuration showed a reversible capacity of ~0.002 mA/cm² respectively after 10 cycles of charge/discharge, whereas the conformal configuration was able to retain a reversible capacity of ~0.26 mAh/cm² even after 30 cycles of charge/discharge. The novel conformal nanostructured electrode-electrolyte configuration showed an improvement in the reversible capacity by two orders of magnitude. Moving to the third dimension with a conformal nanowire based configuration has resulted in geometrical area gain and an associated electrode volume gain. This leads to shorter transport path for Li ion diffusion between the electrodes.

To the contrary in the planar configuration, the Li ions diffused through the entire length of the nanowire or the bulk film respectively. The slow transport of Li ions through solid state anode materials led to the development of a concentration polarization which results in a large loss in capacity delivered. [Owen, J. R. *Chem. Soc. Rev.* 1997, 26, 259-267 ("Owen 1997")]

In the case of the conformal configuration, the problem of concentration polarization was reduced significantly by the conformal wrapping of PMMA electrolyte around every individual nanowire electrode hence resulting in short radial Li ion diffusion distances. The Galvanostatic cycling results (as shown in FIG. 6C) delineate that the conformal design of the electrode-electrolyte assembly in LIB leads to efficient performance with good cycling characteristics and energy densities compared to conventional planar design.

Figure 7:
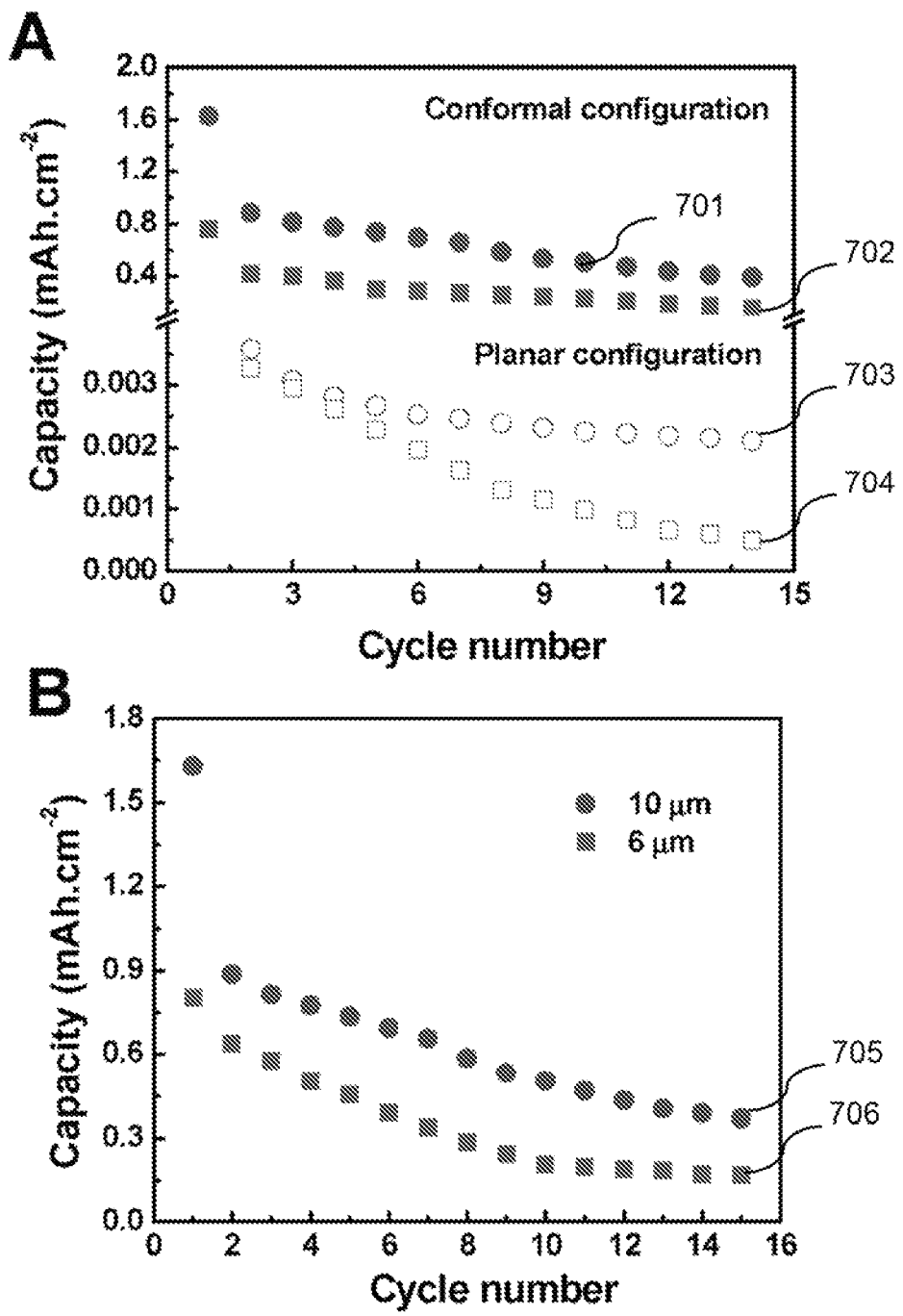
FIGS. 7A-7B show rate capability and capacity retention of conformal Ni—Sn/PMMA assembly.

To realize the high rate power capabilities of this novel conformal electrode-electrolyte assembly for 3D micro/nanobattery applications, the electrochemical performance was studied at higher current rates and with increasing heights of electrode segments, maintaining the areal foot print. Ni—Sn/PMMA (gel electrolyte) with conformal configuration and electrode length of ~10 μm were galvanostatically cycled in a Li half cell at different current rates of 0.12 mA/cm² (0.5 C) and 0.3 mA/cm² (3 C) (curves 701 and 702 in FIG. 7A, respectively) (C-rate is defined as the rate at which the nominal capacity of the electrode material is achieved: 1 C—1 hour to discharge the nominal capacity of the cell). A planar electrode-electrolyte assembly with same electrode height (thickness) is also tested for comparison (curves 703 and 704 in FIG. 7A, respectively).

The difference in the initial capacity is believed to be due to the differences in the accessibility of the bulk electrode film. The capacity behavior of planar assembly followed a typical thin film electrode with a constant decrease at higher current rates. Excellent rate capability were observed with the conformal design and showed good capacity retention even at higher current rates. Reversible and steady capacity of 0.15 mAh/cm² was achieved at a high current rate of 0.3 mA/cm². This was attributed to the short diffusion distance in the Ni—Sn nanowire due to radial diffusion of Li ions.

There are other advantages of the conformal design, apart from the high rate capability, compared to its planar counterpart. Thin film batteries suffer from low energy densities while achieving faster Li ion kinetics in the battery. Increase in film thickness led to loss in rate capability and the discharge capacity due to the development of concentration polarization in the electrode. [Owen 1997] It results in huge ohmic losses and transport resistances. This problem can be smartly alleviated by the conformal design of electrolyte around electrode, which allows for the growth of longer nanowires ensuring the conformal coating of the entire nanowire with the polymer separator, without sacrificing the small foot print area. Short Li ion distances along the entire length of the nanowire led to the efficient utilization of the nanowire's capacity. A comparison of the theoretical capacity expected (based on theoretical specific capacity of Ni—Sn electrode) and the actual measured initial capacity enabled finding the electrode utilization for the planar and conformal configurations. Using the theoretical specific capacity of Ni—Sn electrode (~730 mAh/g [Long 2002]) and the estimated electrode masses for the two electrode configurations (planar: ~4.2 mg, conformal: ~1 mg) the theoretically expected capacities were obtained to be 3.06 mAh and 0.73 mAh for the planar and conformal configurations respectively.

Details for calculating these theoretical expected capacities are provided below:

Theoretical Mass Expected for Each Electrode Configuration:
Density of Ni—Sn taken to be ~8.64 g/cc²
Pore density in commercial Alumina template taken to be ~1E9 pores/cm²
Planar Electrode Configuration:
Area=0.5 cm²
Thickness=10 μm
Volume=0.0005 cm³
Mass=4.32 mg
Conformal Electrode Configuration:
Device Area=0.5 cm²
Thickness (Height of nanowire)=10 μm
Diameter of nanowire=200 nm
Vol. of one Ni—Sn nanowire=3.14⁻¹³ cm³
Total Mass ~1.3 mg
Measured Mass for Each Electrode Configuration:
Planar: ~4.25 mg
Conformal: ~1 mg In the case of planar configuration, a good match was observed between the theoretical and measured mass of the sample. However, in the case of the alumina template deposited samples, the measured mass was observed to be ~80% of the theoretical mass expected for the respective configurations. It is believed that this difference was attributed to non-uniformity in the actual heights and diameter of the nanowires grown in the commercial alumina templates and a small fraction of unfilled pores.

Theoretical Capacity for Planar and Conformal Configurations:
Theoretical specific capacity for Ni—Sn ~730 mAh/g
Theoretical capacity (Conformal configuration): ~0.73 mAh
Theoretical capacity (Planar configuration): ~106 mAh
The state of the art reversible specific capacity for thin film Ni—Sn electrodes is ~500 mAh/g at a C-rate of 0.8 C. [Hassoun 2007]

On comparing these theoretical capacity values to the measured electrochemical values of the initial capacities (FIG. 6C) of the electrode configurations, a very good match was found in the case of the conformal configuration for the first cycle (~0.78 mAh at current rate 0.12 mA/cm² (0.5 C)) (within reasonable error in mass measurement). This shows a far better utilization of the electrode material than that of the planar configuration, which showed an initial capacity ~0.02 mAh/cm² at the same current rate. The capacity losses observed in the subsequent cycles for the conformal design were characteristic losses due to large volume expansion and loss in electrode crystallinity, observed in tin based electrode materials. [Winter 1999] Contrastingly in the case of the planar configuration (FIG. 6C), even the initial capacities were observed to fall far behind the theoretically predicted values indicating poor utilization of electrode material. This discrepancy in the measured and theoretical initial capacities for the 2D configuration was attributed to the severe concentration polarization effects which occur as a result of longer diffusion lengths in the planar films as the film thickness is increased. [Owen 1997] Therefore, an increase in the height of the electrode segment, with the same small foot print area, was expected to result in increased areal capacity along with high power capabilities. [Long 2002]

Figure 8:
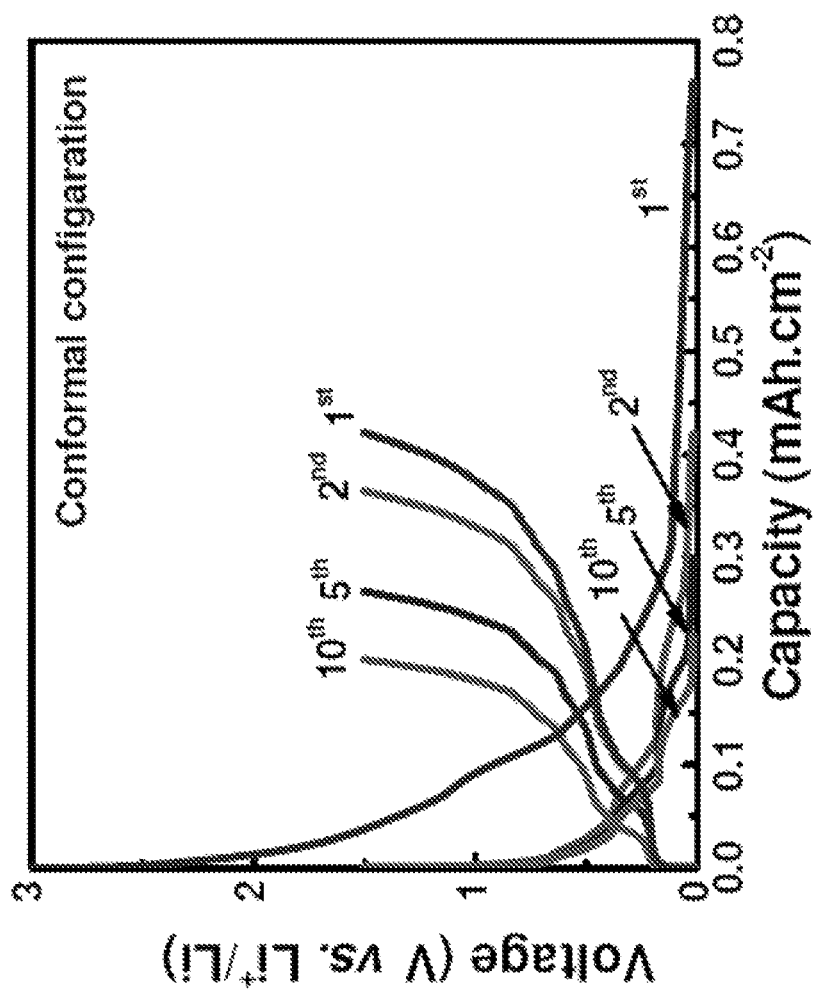
FIG. 8 shows charge-discharge profiles for conformal Ni—Sn/PMMA configuration (Ni—Sn nanowire height ~10 μm) cycled at a rate of 0.3 mA/cm$^2$ between 1.5 V and 0.02 V using PMMA separator soaked in 1M solution of LiPF$_6$ in 1:1 (v/v) mixture of ethylene carbonate (EC) and dimethyl carbonate (DMC).
Figure 9:
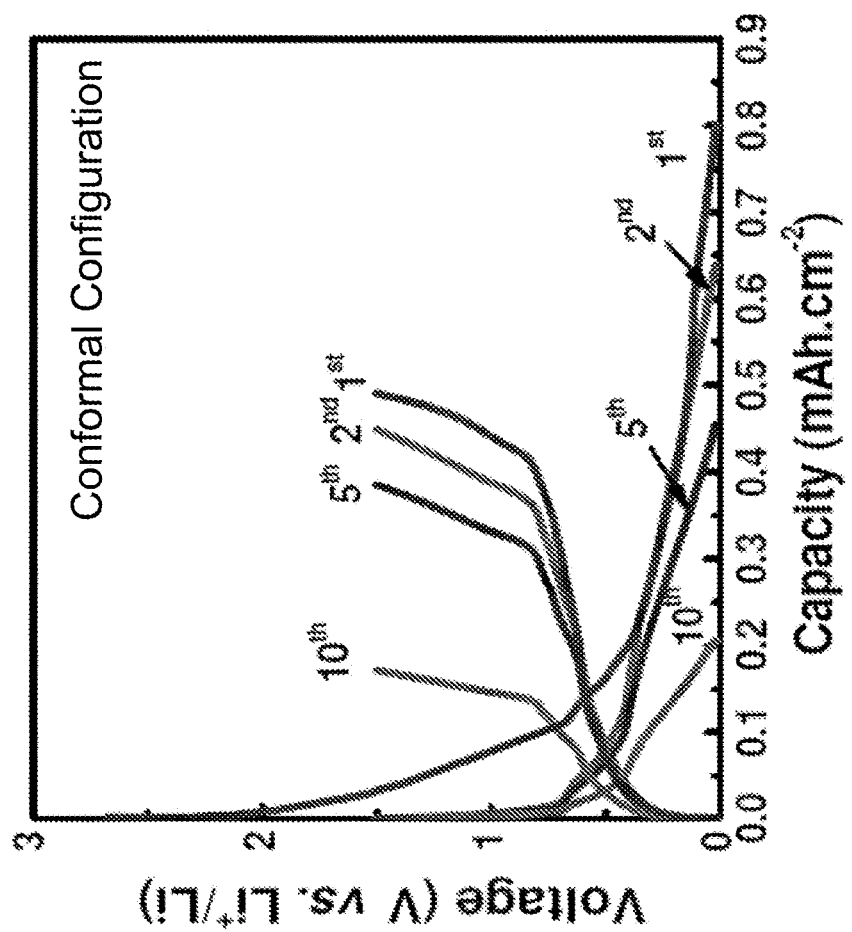
FIG. 9 shows chare-discharge profiles for conformal Ni—Sn/PMMA configuration (Ni—Sn nanowire height ~6 μm) cycled at a rate of 0.12 mA/cm$^2$ between 1.5 V and 0.02 V using PMMA separator soaked in 1M solution of LiPF$_6$ in 1:1 (v/v) mixture of ethylene carbonate (EC) and dimethyl carbonate (DMC).

During this analysis, two samples of Ni—Sn/PMMA core-shell nanowires with varying heights of 6 μm and 10 μm were galvanostatically cycled in Li half cell at current rates of 0.06 mA/cm$^2$ and 0.12 mA/cm$^2$ respectively. The capacity versus cycle number plot (FIG. 7B) showed the increase in areal capacity with increasing electrode height. Reversible capacities of 0.17 mAh/cm$^2$ and 0.37 in mAh/cm$^2$ were obtained for samples with Ni—Sn height of 6 μm and 10 μm respectively. This further confirmed the conformal nature of the polymer coatings around the entire length of the nanowire electrode, as there was no change in the Li ion transport distance. As shown in FIGS. 8 and 9, the discharge profiles of the two samples show that fast Li ion kinetics (power capability) was retained even after increasing the height of the Ni—Sn nanowire electrodes.

In general, Sn-based electrodes suffer from capacity decay with cycling [Winter 1999; Hassoun 2006], however, the present invention demonstrates the novel conformal configuration of the electrode-electrolyte assembly for 3D micro/nanobattery applications and that the concept can be extended for other electrode systems as well. Using Li half cell measurements, the conformal design of the electrode-electrolyte assembly brings an innovative approach to improving areal energy densities of low dimensional batteries yet maintaining their high power capabilities.

Figure 10:
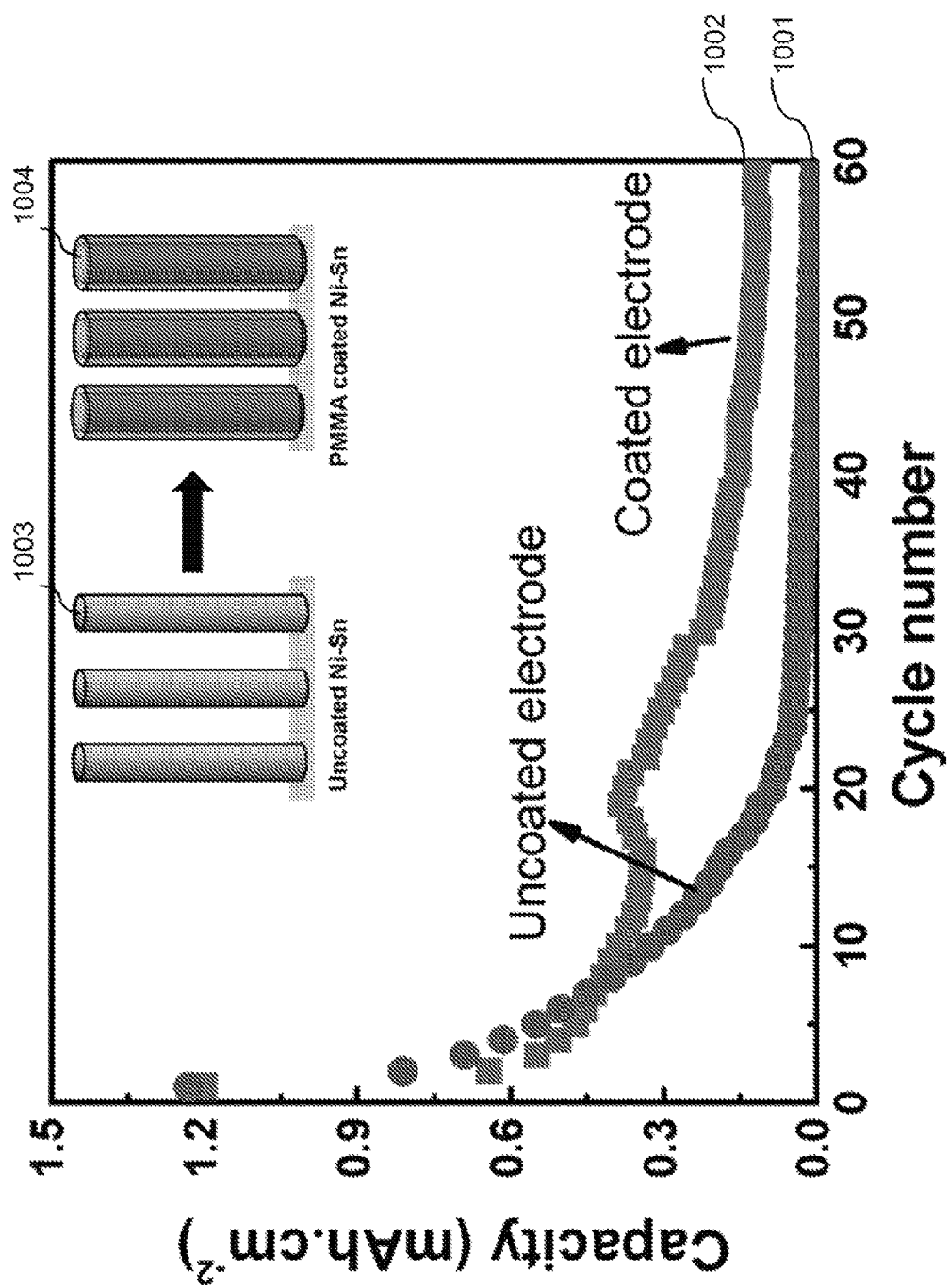
FIG. 10 is a graph showing the electrochemical performance of conformally coated (PMMA) Ni—Sn nanowires and uncoated Ni—Sn nanowires. Curve 1001 (shown by the circles) and curve 1002 (shown by the squares) correspond to the cycling characteristics of the uncoated Ni—Sn nanowires and 3D PMMA coated Ni—Sn nanowires (nanowire length ~12 μm) cycled at 0.3 mA/cm$^2$ (3 C) respectively. The PMMA coating soaked in 1M solution of LiPF$_6$ in 1:1 (v/v) mixture of ethylene carbonate (EC) and dimethyl carbonate (DMC) served as the separator/electrolyte unit for conformal PMMA coated Ni—Sn nanowires whereas an external glass microfiber separator in 1M solution of LiPF$_6$ in 1:1 (v/v) mixture of ethylene carbonate (EC) and dimethyl carbonate (DMC) was used as a separator for the uncoated Ni—Sn nanowires. A schematic of the uncoated Ni—Sn nanowires 1003 and PMMA coated Ni—Sn nanowires 1004 is shown in the inset.

Control experiments have been conducted to compare the electrochemical performance between PMMA coated and uncoated Ni—Sn nanowires. Galvanostatic charge/discharge measurements were conducted on coated and uncoated nanowire arrays at a current rate of 0.3 mA/cm$^2$ (3 C) to investigate the rate capability of the two configurations. As shown from the galvanostatic cycling results of FIG. 10, the PMMA coated Ni—Sn nanowires show an improvement in the reversible capacity retention at a high current rate of 3 C. Curve 1002 reveals that the conformally coated Ni—Sn nanowires show a stable reversible capacity of ~0.2 mAh/cm$^2$ for galvanostatic cycling at fast rates of charge/discharge (3 C) up to 60 cycles of charge/discharge. From these results, it is believed that the conformal PMMA coating is playing a role in improvement of rate capability of the Ni—Sn nanowires. The presence of an interfacial reaction between Ni—Sn and the liquid electrolyte led to the formation of the SEI film on the electrode surface leading to capacity loss over cycling. [Ehinon 2008]

Recent research efforts have characterized the surface films on intermetallic anodes (and specifically Ni—Sn based anodes) and have discussed the dependence of cycling characteristics on surface reactions. [Stjerndahl 2007; Ehinon 2008]

It is believed that the polymer coating around the Ni—Sn nanowires could be helping in stabilizing the SEI film and conceivably suppressing the detrimental surface effects on the electrode leading to the improved cycling characteristics. It is believed that the coating of polymers (which also serves as the separator functionality) around individual electrode Ni—Sn nanowires can be utilized to improve cycling characteristics of this high volume expansion electrode material without the need of external surface modifications. [Fu 2006] There appears to be a direct relation between polymer coatings around high volume expansion electrode nanowires and capacity fade characteristics.

Figure 11:
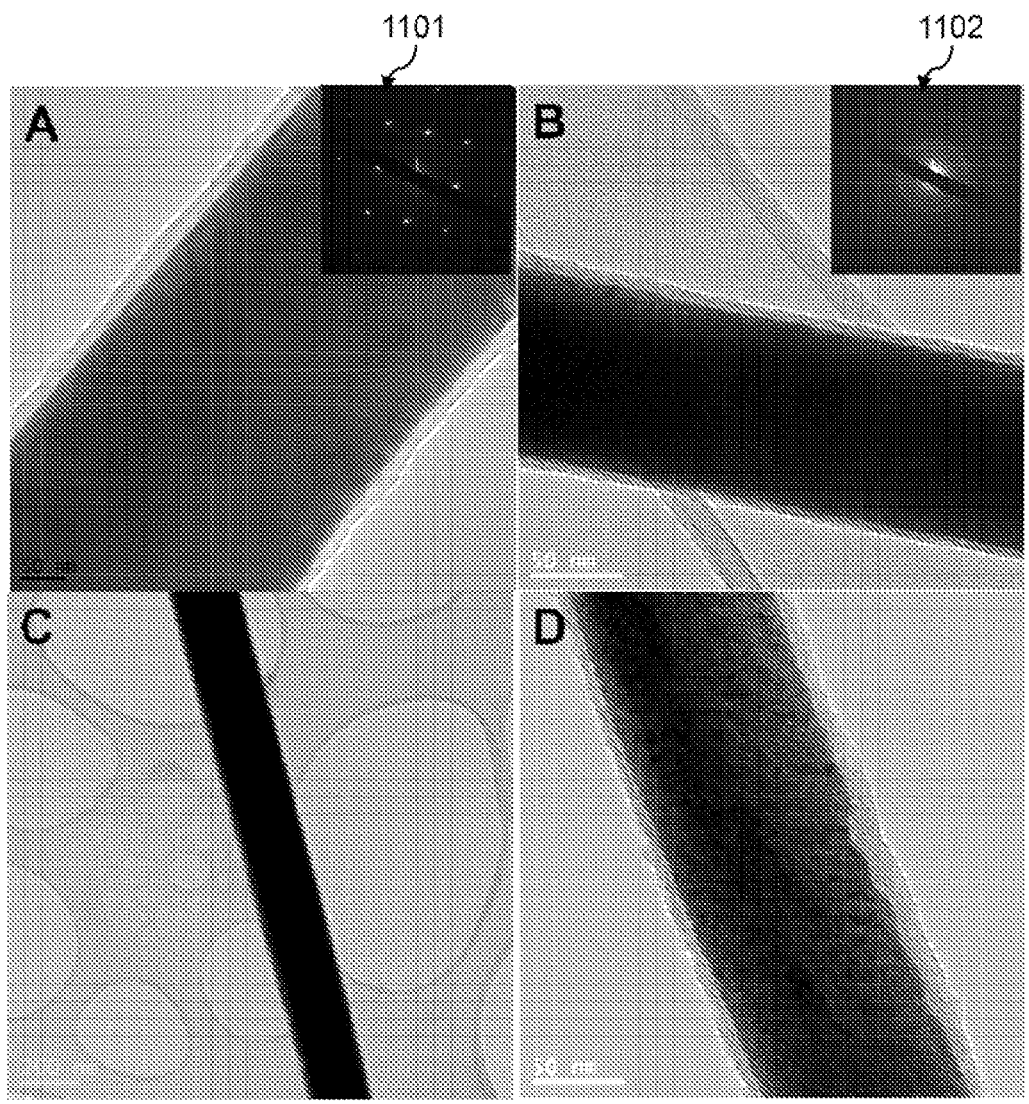
FIGS. 11A-11D are TEM images of a PMMA coated Ni—Sn nanowire.

Extensive TEM analysis has been conducted of the conformally coated Ni—Sn nanowires after galvanostatic charge/discharge cycling, which also reveals that the PMMA shell is intact around the Ni—Sn nanowires. FIG. 11A is a TEM image of a PMMA coated Ni—Sn nanowire before cycling (electron diffraction shown in the inset 1101). FIG. 11B is a TEM image after 15 cycles of charge/discharge (electron diffraction shown in the inset 1102). FIGS. 11C-11D are, respectively, TEM images of low and high magnification images after 60 cycles of charge/discharge. Pin hole free PMMA layers intact around individual Ni—Sn nanowires even after extended cycling. Rough textured walls of the nanowires after cycling indicate loss in crystallinity of electrode due to Li ion insertion/deinsertion upon extended cycling. The absence of pinholes even after extended cycling at a high current rate (3 C) demonstrates the strength of the electrode-electrolyte interface. Hence, the polymer coated electrode nanowires can serve as a great candidate for 3D Lithium ion batteries.

Figure 12:
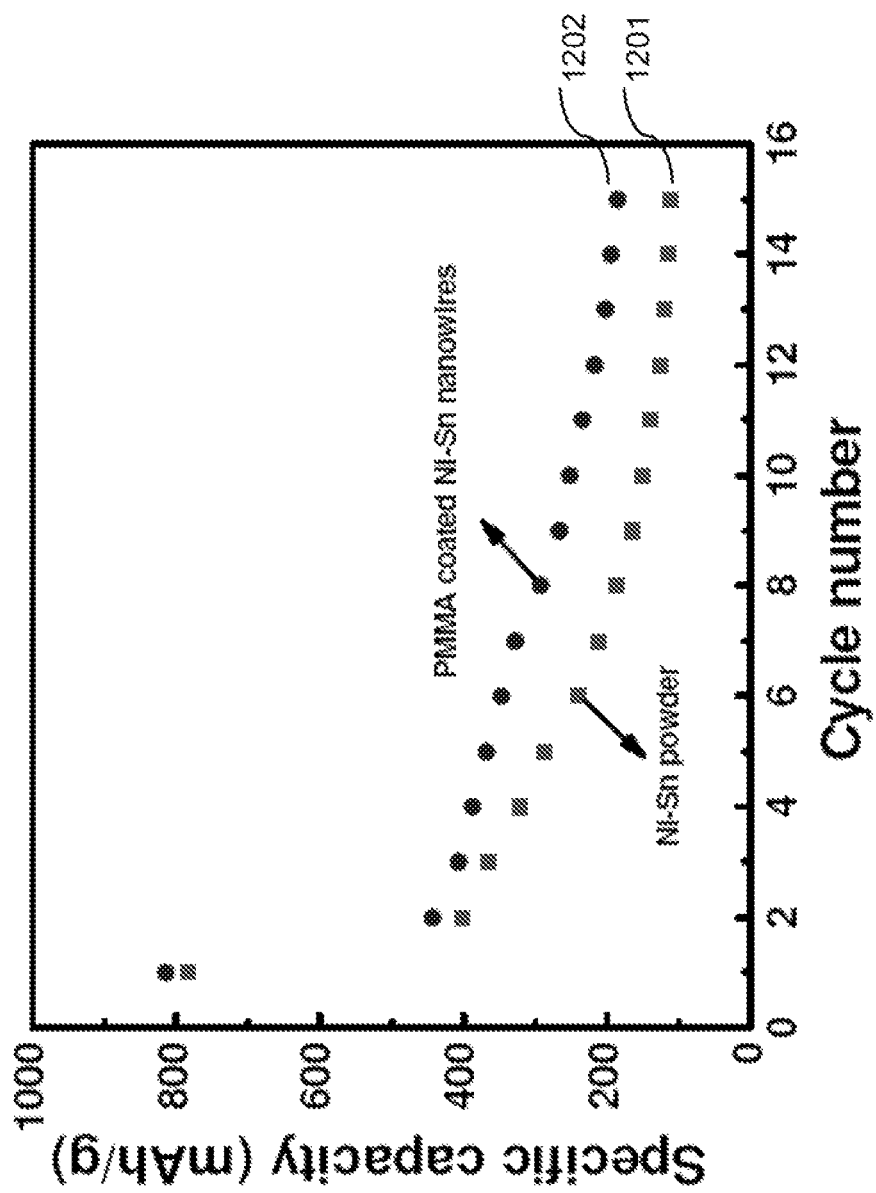
FIG. 12 is a graph comparing the cycling characteristics of the PMMA coated Ni—Sn nanowires with home-made Ni—Sn powder with conductive additive and binder cycled at 0.5 C rate between 1.5 and 0.02 V.

To investigate the importance of alignment and direct contact of electrode to the current collector substrate, a comparison was performed of the cycling characteristics of aligned PMMA coated Ni—Sn nanowires and randomly oriented Ni—Sn nanowire electrodes prepared using conductive additive and binder. FIG. 12 is a graph comparing such cycling characteristics of the PMMA coated Ni—Sn nanowires with home-made Ni—Sn powder with conductive additive and binder cycled at 0.5 C rate between 1.5 and 0.02 V. Reversible capacity of ~200 mAh/g and ~102 mAh/g were observed for the PMMA coated Ni—Sn nanowires and the Ni—Sn powder respectively. (Ni—Sn powder was synthesized by electrodepositing (current density 6 mA/cm$^2$) Ni—Sn nanowires in commercial ANODISC alumina templates and completely dissolving the alumina template in 3M NaOH. The Ni—Sn powder obtained was cleaned several times using deionized water). The results indicated that the PMMA coated Ni—Sn nanowires show an improvement in capacity retained at current rate ~0.5 C. It is believed that the improved rate capability of the conformal electrode/electrolyte configuration could be due to the direct contact of the nanowires to the current collector substrate and the thinner PMMA separator layer which is lacking in the conventionally (randomly oriented with conductive additive and binder on stainless steel substrate with thick glass microfiber separator) prepared Ni—Sn nanowire electrodes.

Figure 13:
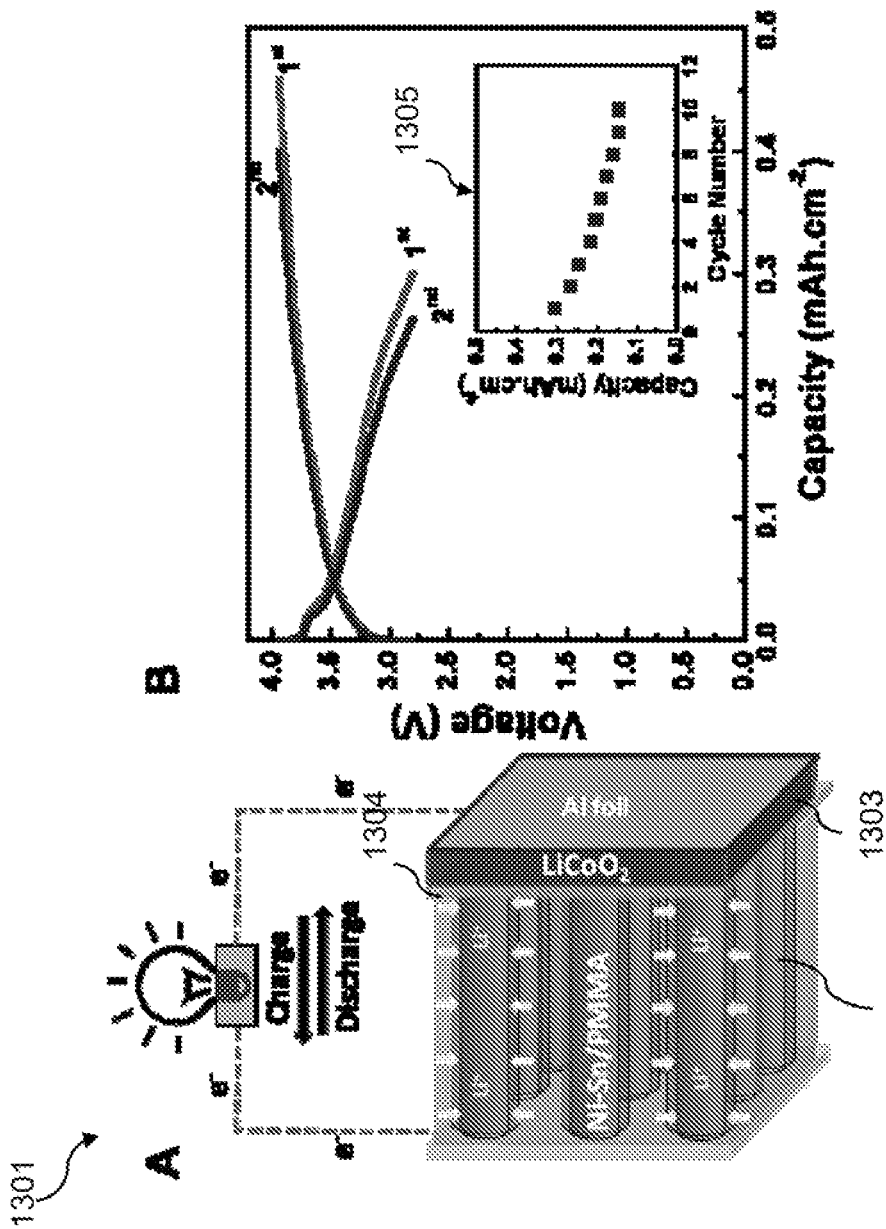
FIGS. 13A-13B illustrate the electrochemical performance of Ni—Sn/PMMA conformal assembly tested in a full Li-ion Cell.

Tests have also been performed on an embodiment of the present invention that is a conformally designed electrode-electrolyte assembly in a complete Li-ion cell using Ni—Sn nanowire as the anode, conformally coated PMMA soaked in typical liquid electrolyte as the gel electrolyte/separator, and commercial LiCoO$_2$ powder as the cathode. FIG. 13A is a schematic of full Li-ion cell 1301 constructed using the conformal Ni—Sn/PMMA (anode/electrolyte) assembly 1302 with LiCoO$_2$ cathode 1303. A thin layer of excess PMMA 1304, coated on top of the assembly serves as the separator. The self supported Ni—Sn/PMMA conformal assembly (10 μm high), was assembled against commercially available LiCoO$_2$ microsized particles.

The galvanostatic charge/discharge measurements were conducted at a current rate of 0.05 mA/cm$^2$ and the full cell with an operating voltage ~3.4 V exhibited reversible storage capacities of ~0.15 mAh/cm$^2$ (with reference to anode). FIG. 13B shows charge-discharge profiles for Ni—Sn/PMMA gel/LiCoO$_2$ configuration (Ni—Sn nanowire length ~10 μm)

cycled at a rate of 0.05 mA/cm² between 2.7 V and 3.95 V using PMMA separator soaked in liquid electrolyte of 1M solution of LiPF$_6$ in 1:1 (v/v) mixture of ethylene carbonate (EC) and dimethyl carbonate (DMC). Cycling characteristics of full cell showing a reversible discharge capacity of around 0.15 mAh/cm² over 10 cycles of charge/discharge is shown in the inset 1305. An optimized cell assembly with a balanced electrode choice would result in improved cycling performances.

The examples provided herein are to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing front the spirit and scope of the invention.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims. cm What is claimed is:

What is claimed is:
1. A method comprising the steps of:
   (a) electrodepositing nanowires into pores of a template, wherein the nanowires are individual nanostructured electrodes;
   (b) widening the pores of the template; and
   (c) after widening the pores of the template, infiltrating a polymer solution onto the template to obtain a polymer layer around the nanowires and yielding an anode-polymer electrolyte core-shell assembly.
2. The method of claim 1 further comprising
   (d) operatively connecting a cathode to the anode-polymer electrolyte core-shell assembly to fabricate a three-dimensional battery.
3. The method of claim 1 or 2, wherein the nanowires comprise an anode material selected from the group consisting of Ni—Sn, TiO$_2$, MnO$_2$, Fe$_3$O$_4$, V$_2$O$_5$, carbon nanotubes, Si, LiCoO$_2$, LiFePO$_4$, and combinations thereof.
4. The method of claim 1 or 2, wherein the nanowires are intermetallic nanowires.
5. The method of claim 4, wherein the intermetallic nanowires comprise a combination of metallic elements selected from the group consisting of Cu—Sb, Cu—Sn, Ti—Si, Al—Sb, Sn—Sb, Ni—Si, and combinations thereof.
6. The method of claim 1 or 2, wherein the nanowires comprise Ni—Sn nanowires.
7. The method of claim 1 or 2, wherein the nanowires comprise an oxide material.
8. The method of claim 7, wherein the oxide material is selected from the group consisting of MnO$_2$, TiO$_2$, V$_2$O$_5$, Fe$_3$O$_4$, CuO, CoO, and combinations thereof.
9. The method of claim 1, wherein the template is an alumina template.
10. The method of claim 1, wherein the step of infiltration comprises a step of spin coating.
11. The method of claim 1, wherein the step of widening the pores of the template comprises using a solution of NaOH.
12. The method of claim 1, wherein the polymer solution comprises a polymer selected from the group consisting of polymethylmethacralate, polyethylene oxide, polyvinyldiflouride, polyacrylonitrile, and combinations thereof.
13. The method of claim 1, wherein the polymer solution comprises polymethylmethacralate in acetonitrile.
14. The method of claim 1, further comprising soaking the polymer layer around the nanowires in LiPF$_6$.
15. The method of claim 14, wherein the LiPF$_6$ is LiPF$_6$ in solution.
16. The method of claim 14, wherein the LiPF$_6$ is 1M LiPF$_6$ in solution.
17. The method of claim 15 or 16, wherein the solution is a solution of ethylene carbonate and dimethyl carbonate.
18. The method of claim 15 or 16, wherein the solution is a 1:1 solution of ethylene carbonate and dimethyl carbonate.
19. The method of claim 1, wherein the cathode comprises a cathode material selected from the group consisting of LiCoO$_2$ and lithium foil.
20. The method of claim 1, wherein the polymer layer around the nanowires has a uniform thickness.
21. The method of claim 1, wherein the polymer layer around the nanowires has a thickness between about 20 and about 100 nm.
22. The method of claim 1, wherein the polymer layer around the nanowires has a thickness between about 20 and about 30 nm.

* * * * *